United States Patent
Castle et al.

(10) Patent No.: US 12,472,749 B2
(45) Date of Patent: Nov. 18, 2025

(54) APPENDING DATA ON A REPLACEABLE SUPPLY COMPONENT

(71) Applicant: HEWLETT-PACKARD DEVELOPMENT COMPANY, L.P., Spring, TX (US)

(72) Inventors: Steven T Castle, Corvallis, OR (US); Paul L Jeran, Boise, ID (US); Jefferson P Ward, Vancouver, WA (US); Alex Michael Oaks, Spring, TX (US); Jesse Otto Sutherland, III, Vancouver, WA (US); Robert Taylor, Washougal, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 192 days.

(21) Appl. No.: 18/276,591

(22) PCT Filed: Feb. 12, 2021

(86) PCT No.: PCT/US2021/017921
§ 371 (c)(1),
(2) Date: Aug. 9, 2023

(87) PCT Pub. No.: WO2022/173445
PCT Pub. Date: Aug. 18, 2022

(65) Prior Publication Data
US 2024/0123736 A1  Apr. 18, 2024

(51) Int. Cl.
B41J 2/175 (2006.01)
H04L 9/32 (2006.01)

(52) U.S. Cl.
CPC ........ B41J 2/17546 (2013.01); H04L 9/3247 (2013.01)

(58) Field of Classification Search
CPC .. B41J 2/17546; H04L 9/3247; G06Q 10/087; G06Q 10/20; G06Q 10/30
See application file for complete search history.

(56) References Cited

U.S. PATENT DOCUMENTS

| 6,019,449 A | 2/2000 | Bullock et al. |
| 6,769,764 B2 | 8/2004 | Barinaga et al. |

(Continued)

FOREIGN PATENT DOCUMENTS

CN   103085488 A   5/2013

OTHER PUBLICATIONS

Zhang et al.; "A Novel Authorization Methodology to Prevent Counterfeit PCB/Equipment through Supply Chain", 2019, IEEE, The 4th International Conference on Integrated Circuits and Microsystems, pp. 128-132. (Year: 2019).*

(Continued)

*Primary Examiner* — Matthew Smithers
(74) *Attorney, Agent, or Firm* — Michael Dryja (57) ABSTRACT

An example method comprising requesting authorization to reprocess a replaceable supply component using first data stored in memory of the replaceable supply component and an interface, the first data including original manufacturing data for the replaceable supply component. The method further comprises, in response to the request, receiving second data using the interface, and appending the original manufacturing data stored in the memory with the second data to designate the replaceable supply component as reprocessed.

15 Claims, 6 Drawing Sheets

(56) References Cited

U.S. PATENT DOCUMENTS

| | | |
|---|---|---|
| 8,160,474 B2 | 4/2012 | Burchette et al. |
| 8,959,590 B2* | 2/2015 | Huebler ............. G07B 17/0008 |
| | | 726/4 |
| 9,304,435 B2 | 4/2016 | Thacker et al. |
| 2004/0212651 A1 | 10/2004 | Johnson et al. |
| 2009/0251513 A1* | 10/2009 | Burchette ............ B41J 2/17553 |
| | | 347/86 |
| 2011/0128567 A1 | 6/2011 | Cachia et al. |
| 2011/0170146 A1* | 7/2011 | Simpson ............. B41J 2/17546 |
| | | 358/1.18 |
| 2011/0229154 A1* | 9/2011 | Kim .................. G03G 15/0894 |
| | | 399/27 |
| 2012/0134687 A1* | 5/2012 | Jones ................ G03G 15/0863 |
| | | 399/12 |
| 2012/0317662 A1 | 12/2012 | Neo et al. |
| 2013/0188213 A1* | 7/2013 | Burke, Jr. ............. G06Q 10/20 |
| | | 358/1.14 |
| 2013/0343779 A1* | 12/2013 | Nicodem ............. B41J 2/17559 |
| | | 399/109 |
| 2015/0042457 A1* | 2/2015 | Thacker, III ............. H04Q 5/22 |
| | | 340/10.3 |
| 2018/0326735 A1* | 11/2018 | Zhang ................ G06F 12/1433 |
| 2019/0182409 A1 | 6/2019 | Shaw et al. |
| 2021/0097798 A1* | 4/2021 | Laackmann ............ G06F 21/44 |
| 2024/0118906 A1* | 4/2024 | Jeran ....................... G06F 21/64 |

OTHER PUBLICATIONS

Islam et al.; "Enabling IC Traceability via Blockchain Pegged to Embedded PUF", 2019, ACM Transactions on Design Automation of Electronic Systems, vol. 24, No. 3, Article 36., pp. 1-23. (Year: 2019).*

Yang et al.; "Hardware-Enabled Pharmaceutical Supply Chain Security", 2017, ACM Transactions on Design Automation of Electronic Systems, vol. 23, No. 2, Article 23, pp. 1-26. (Year: 2017).*

* cited by examiner

APPENDING DATA ON A REPLACEABLE SUPPLY COMPONENT

BACKGROUND

Various types of devices include replaceable supply components, such as inkjet printhead assemblies, and print material containers for two-dimensional (2D) or three-dimensional (3D) printing devices, for example. Example print material containers include inkjet cartridges, toner cartridges, ink supplies, and build material supplies, among others. In some cases, such supply components include integrated circuits, which may be referred to as chips, to communicate with electronic circuitry of the device in which they are installed. While replaceable supply components may be relevant to printing, replaceable supply components may be used in other contexts, such as in the field of biomedical devices for testing fluids and fluid dispensing and/or other material dispensing devices, such as filtered-water dispensers in a refrigerator.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Various types of end-user devices include replaceable supply components, such as 2D and 3D printing devices. Example 2D and 3D printing devices include inkjet printers, dry toner printers, liquid toner printers, and 3D powder bed inkjet printers. Example replaceable supply components include any number of print material containers, such as ink tanks, ink bottles, inkjet printhead cartridges, dry toner reservoirs, liquid toner reservoirs, dry toner cartridges, and build material supplies; and other components that may or may not contain print materials, such as printheads (e.g., a thermal inkjet printhead), long life consumables, imaging units, drums, and developers, among others. Other example end-user devices include fluidic dispensing devices used to eject material onto a medium, such as paper, onto a layer of powered-based build material, or onto a reactive device or another substrate, which may be used for a biologic or chemical assay, and/or for filtering and dispensing fluid such as a water dispenser. The replaceable supply component includes non-volatile memory, which may form part of a chip, used to communicate with electronic circuitry of the device in which the replaceable supply component is attached to. For security and other purposes, the memory and/or chip may be tamper-resistant so that the memory and other components of the chip may not be easily modified. For example, portions of the memory may be non-reprogrammable. In some examples, all of the memory may be non-reprogrammable. In some examples, when the supply is depleted, the chip is "closed" and does not allow further use of the replaceable supply component, or allows limited functionalities, regardless of whether the replaceable supply component is replenished with supply, such as ink, toner, build-material, carbon, chemicals or other fluids and materials.

In some examples, remanufacturers may obtain already-used replaceable supply components and refill the replaceable supply components with supply. However, as memory on the replaceable supply components have limited reprogrammability, when the refilled replaceable supply components are attached to respective end-user devices, the end-user devices may exhibit loss of functionality and/or are unable to authenticate the replaceable supply components. For example, with a printing device, the printing device may not provide the user with a notification of the ink fill level or a warning when the ink level is low when using a replaceable supply component that is replenished or remanufactured. Further, the replaceable supply components may not contain information about the remanufacturer. In some examples, end-user device manufacturers may design devices to accept replaceable supply components manufactured or reprocessed by approved entities, and to reject replaceable supply components manufactured or reprocessed by others. This allows the manufacturers to prevent others from selling new or reprocessed supply components that work properly or with enhanced features in the end-user devices. In some instances, a remanufacturer may replace the memory and/or chip with a new memory and/or chip, which may have limited functionality, may damage the replaceable supply component, and may increase the replacement cost or may limit functionality of the end-user device.

Examples of the present disclosure are directed to appending data to memory of a replaceable supply component to designate the replaceable supply component as reprocessed. The data is appended in a secure manner, such that an end-user device may authenticate the appended data as originating from an authorized source. As the appended data is stored in non-volatile memory, the end-user device may authenticate the appended data as being from the authorized source whether or not the end-user device is network connected.

While the above examples are related to refilling the replaceable supply component, examples are not so limited. Various examples are directed to appending data in memory of a replaceable supply component after the replaceable supply component leaves the original manufacturer factory. For example, the data appended in the memory may include an update for an end-user device, such as a security update that occurred after the replaceable supply component is manufactured and before the replaceable supply component is attached to the end-user device. The data appended may be used to improve security, change device services, and/or change other replaceable supply component behavior or user-end device behavior.

Figure 1:
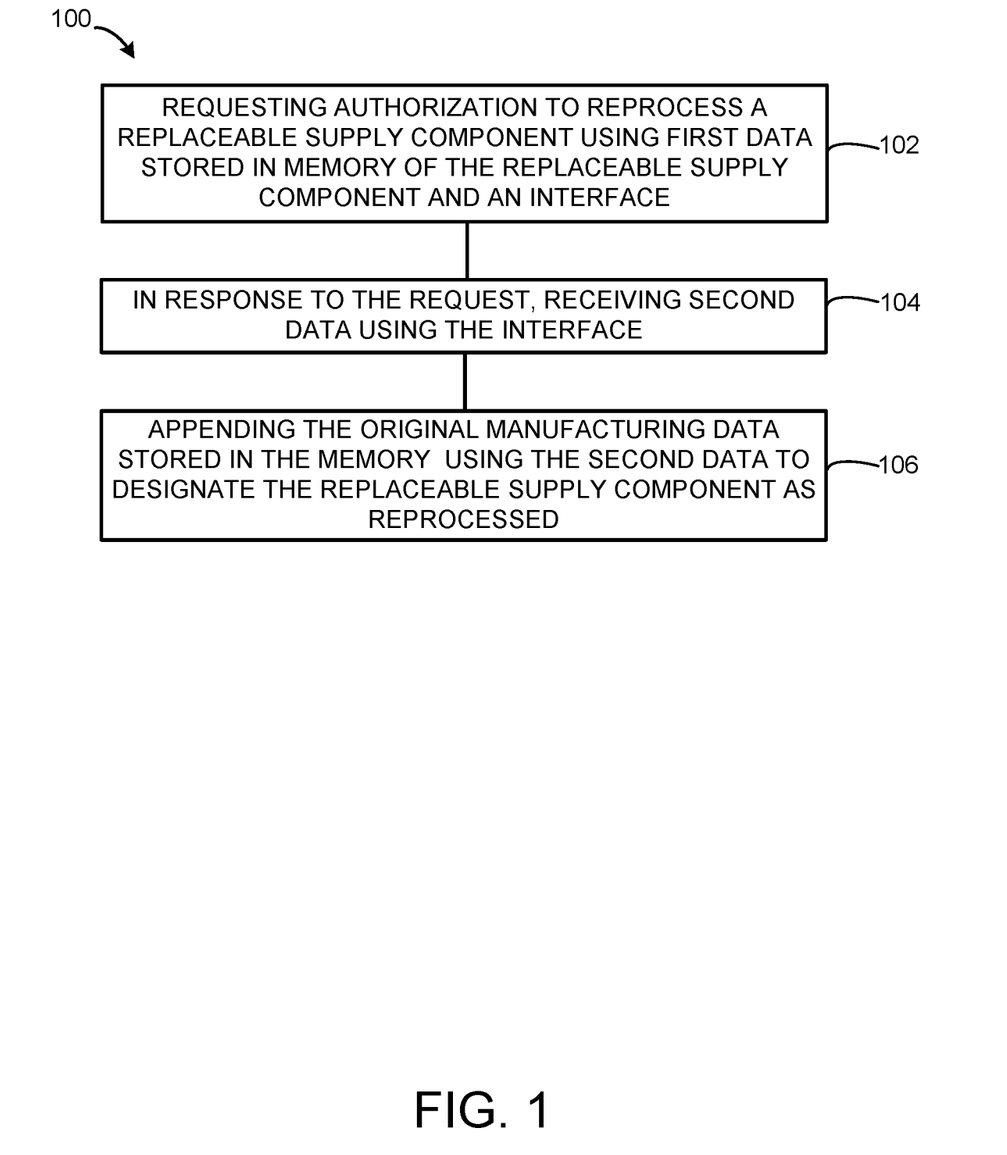
FIG. 1 illustrates an example method for appending data on a replaceable supply component, in accordance with examples of the present disclosure.

Turning now to the figures, FIG. 1 illustrates an example method for appending data on a replaceable supply component, in accordance with examples of the present disclosure. The method 100 may be implemented by an encoding device in various examples and as further described below.

At 102, the method 100 includes requesting authorization to reprocess a replaceable supply component using first data stored in memory of the replaceable supply component and an interface. The first data may include original manufacturing data for the replaceable supply component. The original manufacturing data may include permanent programming data that is non-reprogrammable and/or data fields which may be changed in a specific manner. For example, certain data fields may be changed in the specific manner and once set, may not be converted back. In some examples, the first data includes original equipment manufacturer (OEM) data of memory and/or a chip of the replaceable supply component.

In some examples, the first data includes supply data and the original manufacturing data. The supply data may include data indicative of prior use of the replaceable supply component, such as supply size or fill level, ejection or other use times, such as a date of first installation or other attachment to the end-user device, and/or pages printed, among other data. The original manufacturing data may include a supply identifier (ID) that is unique to the replaceable supply component. In some examples, the original manufacturing data may include additional information about the replaceable supply component, such as the type and/or model of the replaceable supply component, size of the supply, type of supply, identity of the manufacturer of the replaceable supply component, and other data associated with manufacturing, such as the time, date, and/or location of manufacturing.

The memory may include or be non-volatile memory. In some examples, the memory may include a plurality of data partitions for storing data. In some examples, a subset of portions of the memory is non-reprogrammable. In some examples, a subset of portions of the memory is reprogrammable based on rules, as described further below, such as by non-reversible operations. In some examples, all portions of the memory are non-reprogrammable. As described above, the memory may form part of a chip, such as a memory chip, microcontroller, among other types of integrated circuitry. In some examples, the chip may include multiple memory types. In some examples, the memory is controlled by an external controller and/or is attached to an on-board microcontroller of the replaceable supply component.

As previously described, the memory may be tamper resistant and/or includes security protected memory having embedded security features which allow the OEM to build trust into the replaceable supply component. The tamper resistant memory may provide security protection to the end-user device by preventing or mitigating unauthorized sources from writing data on the memory that is actionable by an end-user device. In some examples, the tamper resistant memory may allow for data to be written to the memory or not written to the memory, while being detectable to the entity requesting the data be written. In some examples, the memory and/or chip may use atomic writing of data, in which an entity may send data to be written in the memory and the data is recorded in full or not recorded at all. In some examples, the memory may include a buffer in which the data is first written and then copied from the buffer into longer term, non-volatile memory. In some examples, the non-volatile memory includes the use of write-once fusible bits with read/write erasable non-volatile memory, where once the fusible bits are set, the chip is disabled from overwriting the memory but reading the data is allowed, such as with Electrically Erasable Programmable Read-Only Memory (EEPROM). In some examples, EEPROM may use a charge-pump to generate greater than 18 Volts to write bits to the EEPROM. Reading of the EEPROM may occur at a lower voltage, such as 3.3 or 1.8 Volts. The memory, organized into data partitions, may have physical fuses which when blown may prevent the charge pump from delivering the charge to the EEPROM cells.

In some examples, the memory may include monotonic counters and/or settable bits that may not be unset. The counters employed in some example chips on ink supplies enforce what is sometimes referred to as RW/Max logical behavior. Any value may be written to the contents of the counters, so long as the value is larger than the currently recorded value. This may not preclude the counters from being used as monotonic counters, while offering more capability.

In some examples, the interface may include a network interface. For example, the interface may include a web browser which connects to a portal. The portal may provide access to a reprocess service, as further described herein. For example, the portal may be used to provide the first data from the encoding device to the reprocess service. However, examples are not so limited, and the interface may include an interface between local devices or between components of a device, such as a local network connection and/or a locally executed reprocess service.

In some examples, requesting authorization to reprocess the replaceable supply component may include generating and providing a data structure that includes the first data using the interface. For example, an encoding device may read the first data from the replaceable supply component. The encoding device may package the first data as a data structure that includes the supply ID of the replaceable supply component. The data structure may be cryptographically signed and/or encrypted, for security purposes, using a key, as further described below. Example security purposes include authentication, attestation, and repudiation, among others.

In some examples, the data structure may include a binary large object (blob). Generating the blob may include adding reprocessing data to the first data and cryptographically signing and/or encrypting the blob. Example reprocessing data includes identity of the reprocessor, type and/or capabilities of encoding device (e.g., model, operating system, firmware), encoding device ID, reprocess information (e.g., supply size and/or type to be refilled), among other data. In some examples, the reprocessing data may include an acknowledgement of a successful receipt and encoding of previous appended data, such as a blob previously encoding on the memory. In some examples, a portion of the reprocessing data may be provided as part of a login process to the portal using the interface. For example, a user may enter a user name and password to the interface to provide the identity of the reprocessor.

For example, the blob may include a header and a payload, and may be placed in a cryptographic wrapper, such as in a cryptographic envelope that includes the header and the payload, e.g., a request blob including the first data. The header may include a description of cryptographic operations and parameters employed by the blob, e.g., how the request blob is encrypted and/or how to decrypt the request blob. The payload may include the first data. In some examples, blobs described herein may be JavaScript Object Notation (JSON) data structures. However, any number of data formats may be used including CSV, xml, html, and C#, among others. In various examples, the header is a JOSE (JSON Object Signing and Encryption) header, however examples are not so limited.

At 104, in response to the request, the method 100 includes receiving second data using the interface. Example second data includes a fill level, a gas gauge offset, security data, identity of the reprocessor, a feature enable flag of the replaceable supply component, supply attributes, branding, use rules, time stamp, a reprocess count, and various combinations thereof. For example, the time stamp may include a current time, such as Universal Time Coordinated (UTC) time stamp, at the time of reprocessing and which may be used to update a real-time clock of an end-user device in response to attaching the reprocessed replaceable supply component to the end-user device, such as inserting, installing, or otherwise attaching the replaceable supply component to the end-user device. Use rules include rules associated with behavior of the end-user device and/or use of replaceable supply component, as further described herein.

In some examples, the second data may be received as another blob that is placed in a cryptographic wrapper, such as a cryptographic envelope that includes a header and the payload, e.g., a return blob including the second data, and with the header including a description of cryptographic operations and parameters employed by the blob, e.g., how the return blob is encrypted and/or how to decrypt the return blob. The payload may include the second data which is digitally signed.

In some examples, the second data includes a supply ID that is provided as part of the first data and which ties the second data to the particular replaceable supply component. For example, the second data may be packaged in a data structure that is cryptographically signed and/or encrypted and that includes the supply ID in a header of the data structure. The encoding device may use the supply ID to verify the second data is for the replaceable supply component, such as by matching the supply ID in the header of the data structure to the supply ID read from the memory of the replaceable supply component. In some examples, the second data may include a digital signature, such as a digital signature over the second data which may be used by the end-user device to authenticate the second data.

At 106, the method 100 includes appending the original manufacturing data stored in the memory with the second data to designate the replaceable supply component as reprocessed. In some examples, the second data may designate the replaceable supply component as authentically reprocessed by a trusted source. For example, an end-user device may authenticate the second data as being from the trusted source using the digital signature in the second data. In some examples, an encoding device may verify the authenticity of the second data, such as using the supply ID, and appends the memory with the second data without reading the second data.

In some examples, the digital signature may be generated over the second data and the supply ID using asymmetric signing. As previously described, the data structure may include a header that includes the supply ID and a payload that includes the second data with the digital signature over the payload. With asymmetric signing, two keys are used, one to encrypt and/or digitally sign the payload, and the other to decrypt and/or verify the payload is authentic. The first key may include a private key used to digitally sign data of the data structure and the second key may include a public key used to verify the authenticity of the digital signature. In various examples, the second data may be written to the memory and includes the digital signature, which the end-user device may use to verify the authenticity of the digital signature and/or the second data. For example, the end-user device may include the public key and use the public key authenticate the digital signature, and in response, to verify the second data is from an authorized source, as further described herein.

In some examples, portions of the data fields of the original manufacturing data may be rewritten, e.g., re-coded. For example, appending the second data may include writing a first portion of the second data in a memory location that is separate from the first data and rewriting data fields of the first data using a second portion of the second data. As previously described, the memory may include a plurality of partitions, with the original manufacturing data stored in a first partition of the plurality and the first portion of the second data being written in a second partition of the plurality. Example data fields of the original manufacturing data that may be rewritten include a fill level, manufacturer ID, and feature enable flags of the replaceable supply component, among others.

The portions of data fields of the original manufacturing data may be rewritten to reset the data fields and to designate the replaceable supply component as reprocessed, rejuvenated for reuse, and/or for refilling supply. As an example, when refilling supply in a replaceable supply component, data fields may be rewritten such that firmware of the end-user device recognizes the replaceable supply component as filled and recognizes the fill level or supply size of the replaceable supply component. Such data fields may allow data to change in accordance with a set of rules, and the data fields are rewritten using the second portion of the second data in a manner that complies with the set of rules. By complying with the set of rules, the end-user device may recognize the rewritten data fields in a secure and accurate manner.

In some examples, appending the original manufacturing data with the second data may include writing data to reconfigure an end-user device in response to attachment of the replaceable supply component with the second data to the end-user device. As described above, in some examples, the reconfiguration includes a security update. In some examples, the reconfiguration includes a change to use rules associated with the end-user device and/or replaceable supply component. Example use rules include and/or are associated with a region conversion, branding, supply size or fill and/or other supply attributes, ejection mode (e.g., print mode), and service mode, such as a contract-based service or subscription-based service associated with use of the end-user device, among other changes.

In some examples, the second data includes a security data for the end-user device. For example, appending the original manufacturing data with the second data may include writing a list of trusted supply IDs and/or suspicious supply IDs. The supply IDs may be unique to supply components, and suspicious supply IDs may be indicative of untrusted or malicious supply components. As an example, a malicious entity may reuse the same supply ID for a plurality of replaceable supply components, indicating the supply ID is untrusted or malicious. Examples may include other types of security data and corresponding security updates, such as updated cryptographic keys used for validating replaceable supply components or other devices in communication with the end-user device.

In various examples, the method 100 may be implemented by an encoding device. As used herein, an encoding device includes and/or refers to a device having electrical and/or radio frequency connections to couple to the replaceable supply component, and electronic circuitry (e.g., a processor and memory) to read and write data onto the memory of the replaceable supply component. In some examples, the encoding device may include a printing device or another computing device operated by a reprocessor, such as a remanufacturer. In some examples, the encoding device may include an end-user device, such as a printing device operated by an end user. As used herein, an end-user device includes and/or refers to a device that receives the replaceable supply component and dispenses supply using the replaceable supply component. The end-user device may further include electronic circuitry, e.g., a processor and memory, that reads and validates data from the memory of the replaceable supply component, such as authenticating the data as originating from an authorized source. A reprocessor includes and/or refers to an entity performing reprocessing, which may be in control of and/or operates the encoding device.

In the above-described examples, the encoding device may directly or indirectly provide the request to reprocess the replaceable supply component and receive the second data from a remotely-located computing device or a local computing device under control of or otherwise in communication with the remotely-located computing device. The remotely-located computing device may form part of a cloud computing system. In some examples, the encoding device communicates directly with the remotely-located computing device or the local computing device. In some examples, the encoding device communicates with a first local computing device that communicates with the remotely-located computing device or with a second local computing device using an interface, such as a web browser.

However, examples are not so limited and the local computing device may not be under control of the remotely-located computing device. In some examples, the encoding device may provide the request to reprocess the replaceable supply component and receive the second data from a service that is operated locally by the encoding device.

In some examples, the encoding device includes a printing device, such as a printing device of the reprocessor or of an end user. The printing device (or other type of encoding device) may include specialized firmware to read and write data to and from the memory of the replaceable supply component, such as from a chip of the replaceable supply component. Use of a printing device as the encoding device may reduce the costs for reprocessing and allow for security. The printing device may include an embedded exchange service, such as a webserver, which may be used by the reprocessor to retrieve the first data from the replaceable supply component. The printing device may directly, or indirectly via another computing device, interface with a cloud service, e.g., reprocess service, to provide second data to reprocess the replaceable supply component with. However, examples are not so limited, and other types of encoding devices may be used.

In examples that include use of a cloud service, the cloud computing system may be used to 1) authenticate the reprocessor and/or encoding device and verify the reprocessor and/or encoding device are authorized to reprocess the replaceable supply component and are associated with an account in good standing, 2) authenticate the replaceable supply component is an original or authentically reprocessed and may be successfully reprocessed, 3) generate second data and digitally sign the second data for security, which is provided to the encoding device for writing to the memory.

As an example implementation of the method 100, an encoding device may establish a master key with a reprocess service provided by a cloud computing system. The master key may be stored in memory of the encoding device and on a database accessible to the reprocess service. When a replaceable supply component is attached to the encoding device, the encoding device may read first data from the replaceable supply component and may use the master key and a supply ID from the first data to generate a first key, such as a first one-time key or a first key derivative function (KDF)-derived key. The encoding device may generate a data structure that includes the first data and use the first key to encrypt the data structure used to request authorization to reprocess the replaceable supply component. The data structure may be decrypted by the reprocess service, and/or another computing device, e.g., cloud server or local computing device, that established the master key with the encoding device, by using the master key to obtain the first key and decrypting the data structure using the first key. For example, both the reprocess service (or another service in communication with the reprocess service) and the encoding device may independently increment an index associated with the master key to obtain and/or generate one-time keys and/or KDF-derived keys to place blobs in a cryptographic wrapper and to decrypt data in the blobs, such as a cryptographic envelope that includes a header and the payload. The reprocess service may identify the master key using an encoding device ID provided with the first data, obtain the first key using the index associated with the identified master key, decrypt the first data using the first key, identify and structure the second data based on the type of replaceable supply component, and digitally sign and/or encrypt the second data using asymmetric cryptography. For example, the reprocess service may digitally sign and/or encrypt the second data and a supply ID using a rotating encryption key, such as a private or secrete key, and provides a key ID. The digital signature may be authenticated and/or decrypted by an end-user device using a public key which the end-user device identifies using the key ID that is part of the second data and/or otherwise written to the memory. The reprocess service further uses a second key, such as a second one-time key or a second KDF-derived key, obtained using the master key and the index to encrypt a second data structure that includes the digitally signed second data and the supply.

The encoding device may receive the second data and identify a supply ID in a header of the second data structure that includes the second data, and may obtain the second key using the master key and the index, as incremented by the encoding device, to decrypt data of the second data structure. The encoding device writes the second data, which includes the digital signature over the second data and the key ID, on the memory of the replaceable supply component to designate the replaceable supply component as reprocessed by an authorized source. For example, the second data structure may indicate what data to write on the replaceable supply component, as well as where in the memory to write the data. The encoding device writes the second data, with the digital signature over the second data and the key ID, to the memory. In response to attachment of the replaceable supply component to an end-user device, the end-user device may validate the second data as being authentic and/or from an authorized source by using the key ID to identify a public key to validate the digital signature over the second data and/or decrypt the second data.

However, examples are not so limited and other types of cryptographic authentication may be used, such as public keys and private keys, master keys which are specific to the supply ID, among other techniques.

Figure 2:
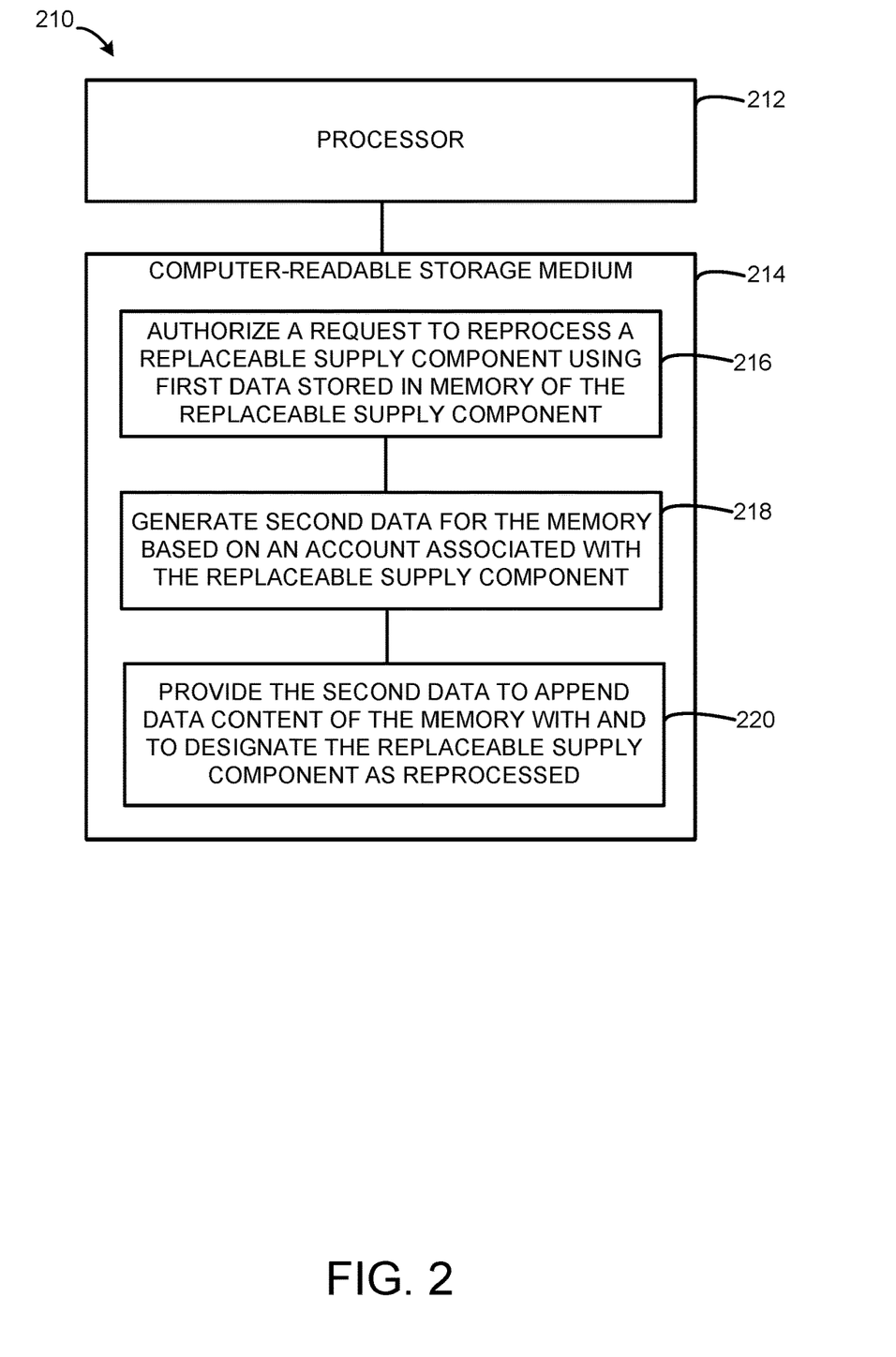
FIG. 2 illustrates an example device including non-transitory computer-readable storage medium, in accordance with examples of the present disclosure.

FIG. 2 illustrates an example device including non-transitory computer-readable storage medium, in accordance with examples of the present disclosure. In various examples, the device 210 may be a remotely-located computing device, a local computing device, or the encoding device used to append data in the memory of the replaceable supply component.

The device 210 includes a processor 212 and memory. The memory may include a computer-readable storage medium 214 storing a set of instructions 216, 218, and 220. The computer-readable storage medium 214 may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 214 may be a non-transitory storage medium, where the term "non-transitory" does not encompass transitory propagating signals.

In some examples, the processor 212 and computer-readable storage medium 214 may form part of a remotely-located computing device, such as a cloud server forming part of a cloud computing system. In some examples, the processor 212 and computer-readable storage medium 214 may form part of a computing device that is local to the encoding device, sometimes herein referred to as "a local computing device". In some examples, the processor 212 and computer-readable storage medium 214 may form part of the encoding device, such as when the encoding device locally executes a reprocess service.

At 216, the processor 212 may authorize a request to reprocess a replaceable supply component using first data stored in memory of the replaceable supply component. The first data, as previously described, includes original manufacturing data for the replaceable supply component and/or supply data. The request may include a request blob provided by an encoding device. The authorization of the request may include authenticating the identity of the encoding device and/or the replaceable supply component, and/or verifying the encoding device and/or replaceable supply component are authorized for reprocessing, e.g., capable of performing and associated with an account in good standing and/or with the reprocess service enabled.

At 218, in response to the authorization, the processor 212 may generate second data for the memory based on an account associated with the replaceable supply component. For example, the supply ID may be used to identify the supply type and/or an account and to generate the second data for appending the memory. The processor 212 may generate the second data as a data structure. In some examples, the second data may be structured as a blob, sometimes herein referred to as a "response blob", based on the type of encoding device and the type of replaceable supply component. In some examples, the processor 212 may cryptographically sign and/or encrypt the response blob, such as digitally signing the second data of the blob and placing the blob in a cryptographic wrapper as previously described.

In some examples, the processor 212 may authorize the request and generate the second data by executing instructions to extract a supply ID and supply data from the first data, and to identify the account using the supply ID. For example, end users and reprocessors may be associated with different supply IDs and encoding device IDs in a database. The database may include data associated with providing the reprocess service, including supply IDs, encoding device IDs, account information, authorization for reprocessing, keys for encrypting and decrypting data, activation or challenge codes, and digital signatures, among other data. The account information may include accounts of reprocessors and end users. For example, the account information may associate an account with specific supply IDs or encoding device IDs of a particular reprocessor, end user, or entity associated with a plurality of end users. The account information may further identify activated features of the reprocess service, and include information about the encoding devices, such as capabilities, and/or information about the replaceable supply components, such as past supply data and supply component capabilities.

In some examples, the processor 212 verifies that the replaceable supply component is authorized for the reprocessing by comparing the supply ID to a list of trusted supply IDs and/or suspicious supply IDs, identifying the supply ID is associated with an account that enabled a reprocess service and is in good standing, determining the replaceable supply component is compatible with rules (e.g., region or stock-keeping unit (sku)) and/or has the correct security and available challenges. In some examples, the processor 212 extracts an encoding device ID from the first data, and uses the encoding device ID to verify authorization of the encoding device for reprocessing the replaceable supply component. The encoding device ID may be unique to the encoding device.

In some examples, the processor 212 may generate the second data as a cryptographically signed data structure, e.g., blob, based on the account and/or an encoding device ID. For example, the processor 212 may select a template to use to structure the response blob based on the type of encoding device and the type of supply component attached, and to include specific data based on the account and/or the supply type. In some examples, different OEMs and/or different types of memory may use different data templates for storing data, which may be identified using the supply ID and used to structure the second data such that an end-user device may recognize the second data with or without a network connection. In some examples, the account may indicate changes in supply service or operation of the end-user device, or other changes in use behavior, such as security updates as previously described.

At 220, the processor 212 may provide the second data to append data content of the memory with the second data and to designate the replaceable supply component as reprocessed. In some examples, the replaceable supply component may be designated as authentically reprocessed by a trusted source. For example, the second data may include a digital signature which may be used by an end-user device to authenticate the second data as being from a trusted source. In some examples, the device 210 provides the second data to an encoding device which appends the second data in the memory. In some examples, the device 210 provides the second data to another computing device, such as a local computing device, which provides the data to the encoding device. In some examples, the device 210 is the encoding device, and a reprocess service executed by the device 210 provides the second data for appending the memory.

In some examples, the authorization may fail. The processor 212, in response to the authorization failing, may provide third data to deny the authorization of reprocessing the replaceable supply component. In some examples, the third data may include an indication of the supply ID of the replaceable supply component being malicious or untrusted, such that subsequent attachment of the replaceable supply component to an end-user device may cause the end-user device to reject the replaceable supply component. In some examples, the third data may include an indication of an error including a description of the error encountered.

In some examples, the authorization may fail due to a threshold reprocess count being reached for the replaceable supply component. The reprocess count may include the number of times the memory has been reprocessed or otherwise had data appended. For example, the replaceable supply component may be reprocessed a threshold number of times and after the threshold is reached, may not be reprocessed again. In some examples, the threshold is set based on the number of partitions of the memory. In some examples, the memory stores the reprocess count as a data field which is updated by the second data. In some examples, the reprocess count is stored in the computer-readable storage medium 214 of the device 210 and/or in a database of a cloud computing system.

As described above, in some examples, the device 210 may form part of a cloud computing system having a plurality of remotely-located and/or distributed computing devices. For example, although FIG. 2 illustrates a single processor 212 and a single computer-readable storage medium 214, examples are not so limited and may be directed to devices and/or systems with multiple processors and multiple computer-readable storage mediums. The instructions may be distributed and stored across the multiple computer-readable storage mediums and may be distributed and executed by the multiple processors.

In some examples, such as with a cloud computing system, the processor 212 may aggregate the supply data with additional supply data obtained from a plurality of additional replaceable supply components. For example, the first data may include a supply ID and the supply data associated with prior use of the replaceable supply component. In some examples, the processor 212 may aggregate the supply data with the additional supply data, and provide analytics on the use of supplies using the supply data, the additional supply data, and associated supply IDs. The supply data and additional supply data may be obtained from encoding devices and/or end-user devices that are network connected. The data analytics may be used to track identities of reprocessors, when (e.g., date and time) reprocessing occurs, what end users or associated entities are using reprocessing and/or remanufacturing of replaceable supply components, when particular replaceable supply components are attached to end-user devices, among other analytics. In some examples, the analytics may be used to update the list of trusted supply IDs, the list of suspicious supply IDs and/or identify replaceable supply components that have reached the threshold reprocess count.

Figure 3:
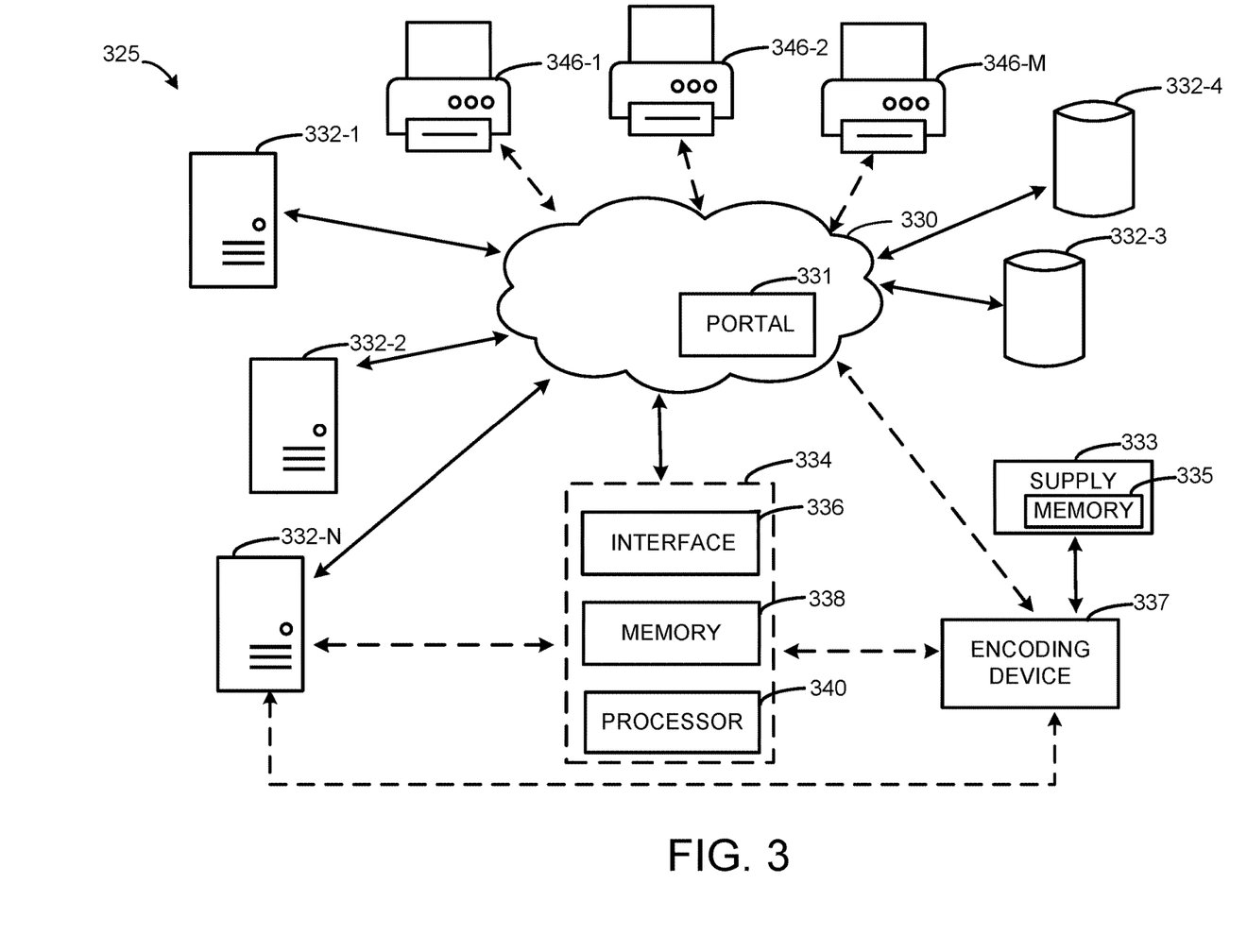
FIG. 3 illustrates an example system for appending data on a replaceable supply component, in accordance with examples of the present disclosure.

FIG. 3 illustrates an example system for appending data on a replaceable supply component, in accordance with examples of the present disclosure. In some examples, the system 325 may include or form part of a cloud computing system; however, examples are not so limited.

The example system 325 includes a plurality of distributed computing devices 332-1, 332-2, 332-3, 332-4 . . . 332-N, herein generally referred to as the "plurality of distributed computing devices 332" for ease of reference, that provide a reprocess service. A reprocess service may include interoperable routines that when executed are used to authenticatively and securely reprocess a replaceable supply component. In some examples, the plurality of distributed computing devices 332 may include servers 332-1, 332-2, 332-N and/or databases 332-3, 332-4 that form part of a cloud computing system 330.

The example system 325 further includes a portal 331 to communicatively connect the plurality of distributed computing devices 332 to a plurality of external devices. The plurality of external devices may include an encoding device 337, a computing device 334, and/or a plurality of end-user devices 346-1, 346-2 . . . 346-M. In some instances, a subset of the plurality of external devices may not be connected to the cloud computing system 330, such as the encoding device 337 and/or particular end user-devices 346-1, 346-2 . . . 346-M. The subset of the plurality of external devices may not be in communication with the plurality of distributed computing devices 332-1, 332-2, 332-3 . . . 332-N. FIG. 3 illustrates optional communication connections with dashed arrows. Although FIG. 3 illustrates the end user-devices 346-1, 346-2 . . . 346-M as printing devices, examples are not so limited and the end-user devices may include other types of end-user devices as previously described. In some examples, the system 325 may include a firewall between the plurality of distributed computing devices 332-1, 332-2, 332-3 . . . 332-N and the plurality of external devices, such as devices under control of the reprocessor.

In some examples, the plurality of distributed computing devices 332 may provide the reprocess service. For example, the plurality of distributed computing devices 332 may receive, from the encoding device 337, a request to reprocess a replaceable supply component 333. As previously described, the request may include the first data including original manufacturing data stored in memory 335 of the replaceable supply component 333.

In some examples, the encoding device 337 may provide the request directly to the portal 331. For example, the encoding device 337 may include the interface 336 used to connect to the portal 331. In some examples, the encoding device 337 provides the first data and/or the request to a separate computing device 334 that includes the interface 336 to connect to the portal 331. For example, the computing device 334 includes a memory 338 and a processor 340 to execute instructions stored in the memory 338 to provide the interface 336 to communicate with the portal 331. The interface 336 may include a web browser and the encoding device may copy the first data and provide the first data to the interface 336, such as by copy and paste operations.

In response to the request, the plurality of distributed computing devices 332 may authorize the request. For example, the plurality of distributed computing devices 332 may verify authorization of the encoding device 337 for the reprocess service using an encoding device ID, and verify authorization of the replaceable supply component 333 for the reprocess service using a supply ID. In some examples, the authorization of the request may include authenticating the identities of the replaceable supply component 333 and the encoding device 337, and verifying the replaceable supply component 333 and the encoding device 337 are authorized for the reprocess service.

In response to the authorization of the request, e.g., verified authorization of the encoding device 337 and the replaceable supply component 333, the plurality of distributed computing devices 332 may provide second data to the encoding device 337 to append data content of the memory 335 with the second data and to designate the replaceable supply component 333 as reprocessed. The second data may be generated as a blob that is formatted based on a type of replaceable supply component 333. For example, the blob may include the supply ID that is unique to the replaceable supply component 333 and which is provided as part of the request. The second data may be identified based on an account associated with the supply ID of the replaceable supply component 333 and the type of supply. For example, the second data may include different attributes for different types of supply, such as fill level for a toner cartridge or base key table, a datastore, a challenge length, and partition data for an ink cartridge. In some examples, the blob may be structured to prevent other devices from interpreting the data, such as using encryption and a digital signature. For example, the plurality of distributed computing devices 332 may encrypt and/or digitally sign the blob in a manner that is specific to the replaceable supply component 333.

However, examples are not so limited. In some examples, the encoding device 337 communicates the request to a particular computing device 332-N of plurality of distributed computing devices 332 which forms part of a local network with the encoding device 337 and/or the computing device 334. For example, the encoding device 337 may directly communicate with the particular computing device 332-N or communicate with the computing device 334 that communicates with the particular computing device 332-N. In some examples, the particular computing device 332-N may be in communication with and/or under control of the cloud computing system 330, and obtains the relevant data to provide the reprocess service from the cloud computing system 330. In other examples, the encoding device 337 may itself include the relevant data to provide the reprocess service, which may be obtained from the cloud computing system 330.

In some examples, the plurality of distributed computing devices 332 may track use of the reprocess service. For example, the plurality of distributed computing devices 332 may aggregate supply data and reprocessing data from the request with additional supply data and additional reprocessing data from a plurality of additional replaceable supply components. The plurality of distributed computing devices 332 may track supply use and use of the reprocess service using the aggregated data and may provide analytics as previously described in connection with FIG. 2.

In some examples, the use of the reprocess service by or associated with the replaceable supply component 333 may be analyzed. For example, aggregated reprocessing data may show that a particular replaceable supply ID is associated with memory that has been cloned. In response, the supply ID of the replaceable supply component may be identified as suspicious and/or malicious, added to a list of suspicious supply IDs, and/or removed from a list of trusted supply IDs.

Figure 4:
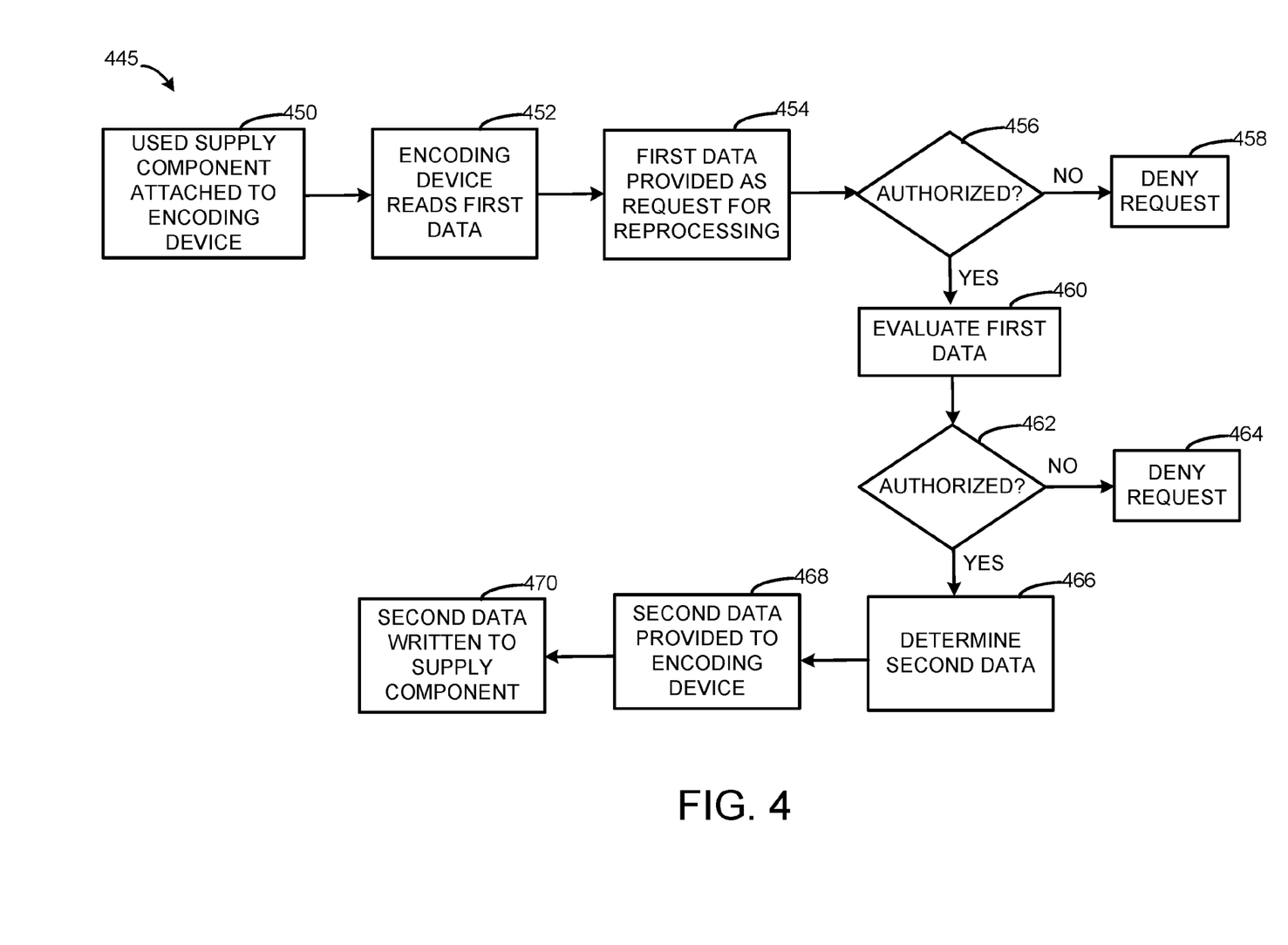
FIG. 4 illustrates an example method for appending data on a replaceable supply component, in accordance with examples of the present disclosure.

FIG. 4 illustrates an example method for appending data in memory of a replaceable supply component, in accordance with examples of the present disclosure. The method 445 of FIG. 4 may form part of the method 100 of FIG. 1 and/or may be executed using the device 210 of FIG. 1 and/or the system 325 of FIG. 3 in various examples.

At 450, the replaceable supply component is attached to an encoding device, such as being inserted into or installed. For example, an already-used replaceable supply component may be attached to a printing device operating as an encoding device.

At 452, the encoding device reads first data from memory of the replaceable supply component. In some examples, the encoding device may send a request to the memory of the replaceable supply component to receive first data, and in response to the request, the memory sends the first data that is stored thereon. In some examples, the encoding device reads all of the data on the memory, such as the supply ID, the region, and supply attributes. In a specific example, for a printing supply component, the encoding device may read the supply ID, region, pages printed, and number of times used.

At 454, the first data is provided as part of a request to reprocess the replaceable supply component by the encoding device. In some examples, all the data read from the memory is provided as part of the request. In some examples, a subset of the data read is provided as part of the request. For example, the encoding device may copy and paste the first data into a web browser using an embedded exchange service, e.g., webserver. The web browser may form part of the encoding device or may be on a separate computing device which interfaces with the encoding device. In some examples, the web browser may interact with the portal of the cloud computing system. For example, the web browser may provide the request to the portal, thereby sending the request to the cloud computing system. In some examples, the request may include a supply size or fill, region, brand, and identity of the manufacturer or reprocessor, among other data. Prior to sending the request, a user may login to the portal using a user name and password, and which ties the request to an account of the reprocessor. In some examples, the request is provided by the encoding device to the cloud computing system.

At 456, the method 445 includes determining if the encoding device is authorized to reprocess the replaceable supply component. For example, the identity of the encoding device may be authenticated and the encoding device is verified as being authorized for the reprocessing. In response to determining the encoding device is not authorized, at 458, the request is denied. In response to determining the encoding device is authorized, at 460, the first data is evaluated. For example, a supply ID and supply data are extracted from the first data sent as part of the request are validated as comply with rules, as described below.

In some examples, the cloud computing system may perform the determination, at 456, the request denial, at 458, and the evaluation of the first data, at 460. For example, the cloud computing system may authenticate and authorize the encoding device by determining if the reprocessor and/or the encoding device are trusted sources and/or are authorized to reprocess replaceable supply components based on an account associated with the login information and/or an encoding device ID. As previously described, the cloud computing system may include a database that includes accounts associated with reprocessors and end users, supply IDs of a plurality of replaceable supply components, encoding device IDs of a plurality of registered encoding devices, and information about the replaceable supply components, among other data. The reprocessor may have an account that associates the reprocessor with different encoding devices and indicates authorization or not for reprocessing different replaceable supply components. The cloud computing system, via a computing device, may query the database to verify the supply ID and/or encoding device ID. In some examples, evaluating the first data may include determining supply data or other first data is compatible with rules (e.g., correct region or sku), and/or verifying the memory has the correct security and available challenges.

At 462, the method 445 includes determining if the replaceable supply component is authorized for reprocessing. For example, the identity of the replaceable supply component may be authenticated and the replaceable supply component is verified as being authorized for the reprocessing. In response to determining the replaceable supply component is not authorized, at 464, the request is denied. In response to determining the replaceable supply component is authorized, at 466, the second data is determined. And, at 468, the second data is provided to the encoding device.

In some examples, the cloud computing system may perform the determination, at 462, the request denial, at 464, the generation of the second data, at 466, and providing the second data to the encoding device, at 486. For example, the cloud computing system may authenticate and authorize the replaceable supply component by authenticating the identity of replaceable supply component using the supply ID and determining if the replaceable supply component is authorized for reprocessing based on an account or other stored data associated with the supply ID. In some examples, the cloud computing system may generate the second data by determining data fields to be written and/or rewritten, such as region, brand, fill level, gas gauge offset, security updates, a reprocessor identifier, a feature enable flag of the replaceable supply component, supply attributes, use rules, time stamp, a reprocess count, and a protective digital signature. The cloud computing system may send the second data to the web browser, and may indicate a charge for the reprocess service.

At 470, the second data is written, by the encoding device, to the memory of the replaceable supply component to designate the replaceable supply component as reprocessed. In some examples, the second data is copied from the web browser and provided to the encoding device using the exchange service, e.g., a webserver. The encoding device may write the second data on the memory and the replaceable supply component is removed from the encoding device. In some examples, the replaceable supply component is designated as reprocessed and/or ready for refilling.

As a specific example, the encoding device registers with the reprocess service and stores a master key. When the replaceable supply component is inserted, or otherwise attached to the encoding device, the encoding device reads first data from the memory and generates a first key using the master key and an index that is incremented by the encoding device. The encoding device packages the first data into a request blob that is encrypted using the first key and/or is digitally signed, such as placing the request blob in a cryptographic wrapper. The first data in the request blob includes the supply ID that is unique to the replaceable supply component.

The reprocess service receives the request blob and decrypts data in the request blob by obtaining the first key. For example, the reprocess service identifies the master key using the encoding device ID in the header of the request blob, obtains the first key using an index that is incremented by the reprocess service or another service and the master key, and decrypts data in the request blob using the first key. The reprocess service may verify the replaceable supply component is authorized for reprocessing using the supply ID in the request blob. In some examples, the supply ID may be tied to an account in a database that identifies the reprocess service is enabled and/or a reprocess count of the replaceable supply component. In some examples, the supply ID may identify the supply type and the reprocess service may verify the supply type may be reprocessed based on compatibility with rules, security settings, and/or available challenges, among other features. The reprocess service may further verify that the encoding device is authorized using the encoding device ID. The encoding device may be registered with the reprocess service and the encoding device ID is stored in the database. For example, the encoding device ID may be used to verify that the encoding device is associated with a trusted source. In some examples, the reprocess service may verify the reprocessor operating the encoding device is authorized, such as identifying the reprocessor has enabled the reprocess service and/or is in good standing. The verification may be based on an account associated with the encoding device ID and/or the login information provided to the portal. In response to the authorization, the reprocess service generates the second data, which includes data specific to and/or depending on the type of replaceable supply component and is digitally signed. The reprocess service packages the second data into a response blob that is encrypted using a second key generated using the master key and the index incremented by the reprocess service or another service, such as placing response blob in a cryptographic wrapper. The response blob including the second data may include the supply ID in the header, such that the encoding device may verify the returned blob is authentic to the replaceable supply component and writes the second data in the memory. The second data may be written with the digital signature over it and includes a key ID for the end-user device to use to verify authenticity of the second data. For example, the end-user device may not read and/or act upon the second data unless the second data is authenticated by decrypting and/or validating the digital signature using the key identified by the key ID. Authenticating the second data may indicate that the second data is from a trusted and/or authorized source.

FIGS. 5A-5D illustrate example systems for appending data on a replaceable supply component, in accordance with examples of the present disclosure. Some examples of the present disclosure may include different variations, such as the encoding device including an end-user device and/or the encoding device reprocessing the replaceable supply component using a locally stored and executed reprocess service.

Figure 5A:
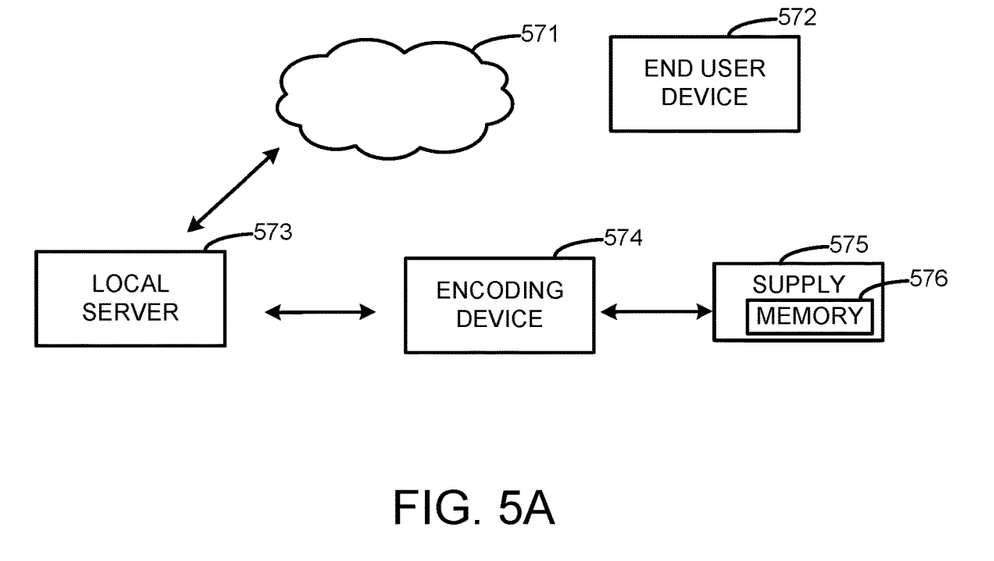
FIGS. 5A-5D illustrate example systems for appending data on a replaceable supply component, in accordance with examples of the present disclosure.

FIG. 5A illustrates an example system that includes an encoding device 574 that receives the replaceable supply component 575 having memory 576 and communicates a request to reprocess the replaceable supply component 575 to a local server 573 using a local network communication. The local server 573 may be in communication with and/or controlled by a cloud computing system 571. For example, the local server 573 may store data for generating the second data and for encrypting and digitally signing the second data, such as keys, supply IDs, encoding device IDs, digital signatures, and account information, among other data. In some examples, the replaceable supply component 575 is appended with the second data that may be verified as authentic by the end-user device 572 that may or may not have a network connection, such as verifying the second data is from a trusted source using the digital signature over the second data.

Figure 5B:
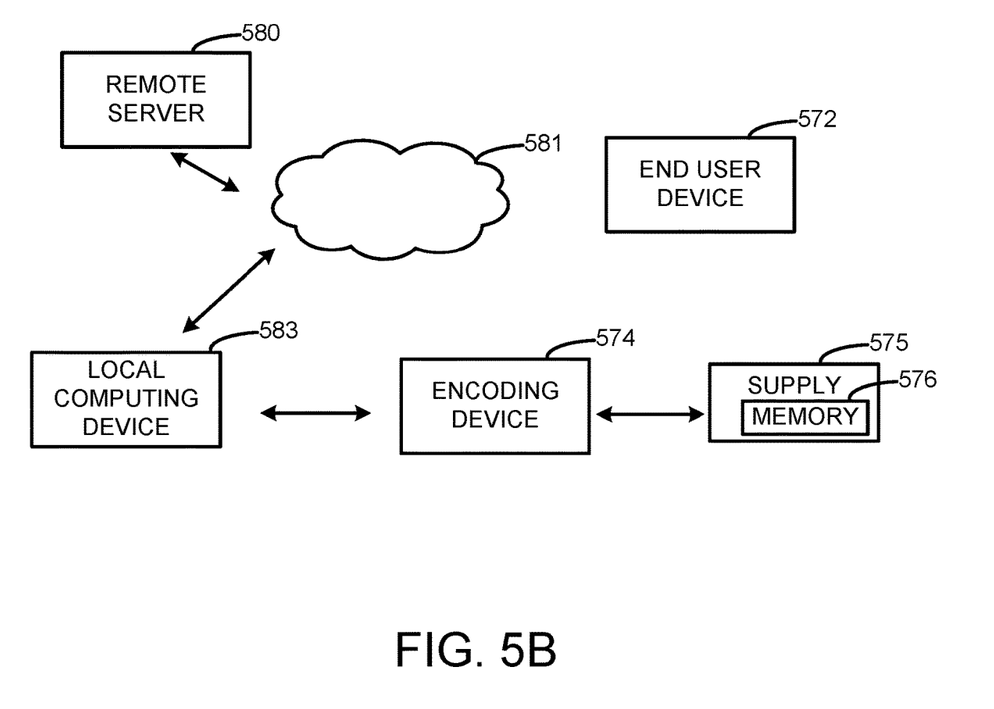

FIG. 5B illustrates an example system that includes an encoding device 574 that receives the replaceable supply component 575 having memory 576 and communicates a request to reprocess the replaceable supply component 575 to a local computing device 583. The local computing device 583 may communicate with the cloud computing system 581 using a portal, as illustrated by FIG. 3. A remote server 580 of the cloud computing system 581 processes the request and provides the second data to the local computing device 583 which communicates the second data to the encoding device 574. The replaceable supply component 575 is appended with the second data that may be verified as authentic by the end-user device 572.

Figure 5C:
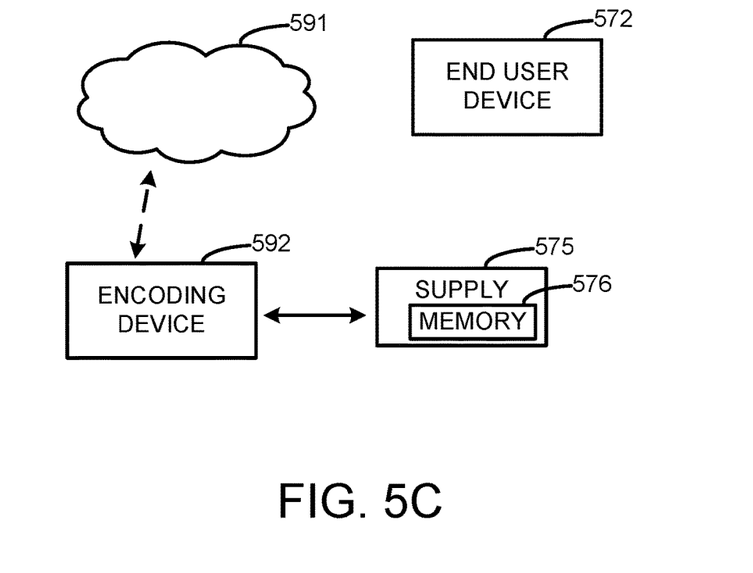

FIG. 5C illustrates an example system that includes an encoding device 592 that receives the replaceable supply component 575 having memory 576 and processes a request to reprocess the replaceable supply component 575. In some examples, the encoding device 592 may include and execute the reprocess service, which may be obtained from the cloud computing system 591 using a portal or another source. The encoding device 592 locally processes the request and provides the second data for appending the memory 576 with, which may be verified by the end-user device 572.

Figure 5D:
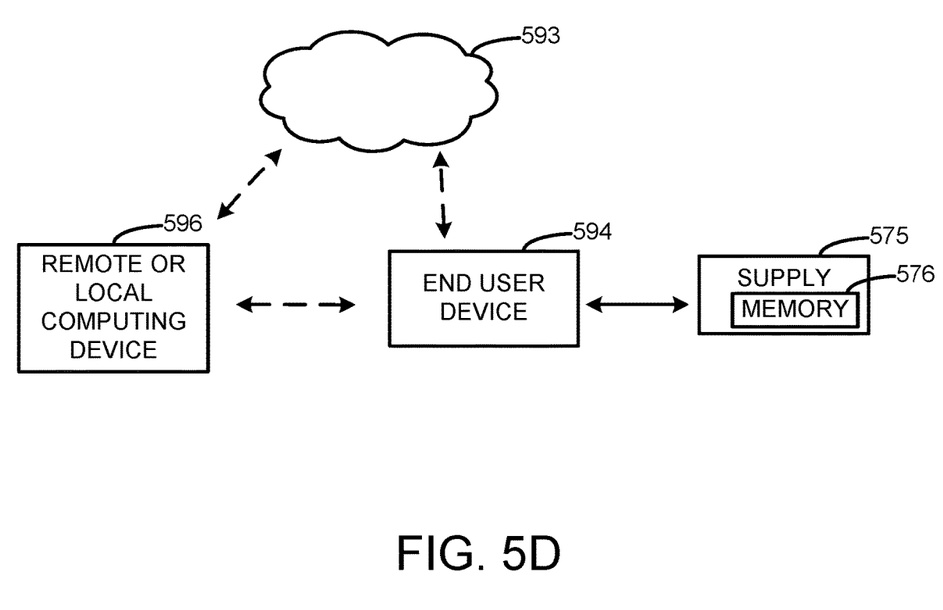

FIG. 5D illustrates an example system that includes an encoding device that is an end-user device 594. The end-user device 594 receives the replaceable supply component 575 having memory 576 and communicates a request to reprocess the replaceable supply component 575 to a local computing device or remote computing device 596 using a local network or the portal of the cloud computing system 593, respectively. The local computing device or remote computing device 596 may process the request and provide the second data to the end-user device 594. The replaceable supply component 575 is appended with the second data by the end-user device 594.

Examples in accordance with the present disclosure are directed to reprocessing replaceable supply components in a secure manner such that the replaceable supply components may be used and/or reprocessed multiple times while still providing full functionality. The reprocessing may allow for additional end user choices and reconfiguration of end-user devices, such as providing dynamic security updates that improve security of the end-user devices without use of a firmware update. The end-user devices may be securely updated without being network connected by appending data to the memory of the replaceable supply components that may be validated as originating from a trusted source.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
transmitting, by a computing device of a remanufacturer of replaceable supply components to a reprocess service, a request for authorization to reprocess a replaceable supply component using first data stored in memory of the replaceable supply component and an interface, the first data including original manufacturing data for the replaceable supply component;
in response to the request, receiving, by the computing device of the remanufacturer from the reprocess service, second data using the interface, the second data indicating that a manufacturer of the replaceable supply component has approved reprocessing of the replacement supply component by the remanufacturer; and
appending, by the computing device of the remanufacturer, the original manufacturing data stored in the memory with the second data to designate the replaceable supply component as reprocessed and to designate that reprocessing of the replaceable supply component by the remanufacturer has been approved by the manufacturer of the replaceable supply component.

2. The method of claim 1, wherein appending the memory includes writing a first portion of the second data in a memory location separate from the first data and rewriting data fields of the first data using a second portion of the second data to designate the replaceable supply component as authentically reprocessed by a trusted source.

3. The method of claim 1, wherein the first data further includes supply data and the original manufacturing data includes permanent programming data that is non-reprogrammable, and requesting the authorization to reprocess the replaceable supply component further includes generating and sending a binary large object (blob) that includes the first data to a computing device, by an encoding device, using the interface.

4. The method of claim 3, wherein generating the blob further includes adding reprocessing data to the first data and cryptographically signing the blob that includes the first data and the reprocessing data.

5. The method of claim 1, wherein appending the original manufacturing data with the second data includes writing data selected from:
a fill level, a gas gauge offset, security data, a reprocessor identifier, a feature enable flag of the replaceable supply component, supply attributes, use rules, time stamp, a reprocess count, and combinations thereof.

6. The method of claim 1, wherein appending the original manufacturing data with the second data includes writing data selected from:
a list of trusted supply identifiers, a list of suspicious supply identifiers, and combinations thereof.

7. The method of claim 1, wherein appending the original manufacturing data with the second data includes writing data to reconfigure an end-user device in response to attachment of the replaceable supply component with the second data to the end-user device.

8. A non-transitory computer-readable storage medium storing instructions that when executed cause a processor providing a reprocess service to perform processing comprising:
receiving, from a computing device of a remanufacturer of replaceable supply components, a request to reprocess a replaceable supply component using first data stored in memory of the replaceable supply component, the first data including original manufacturing data for the replaceable supply component;
in response to the request, authorizing the request;
in response to successful authorization, generating second data for the memory based on an account associated with the replaceable supply component, the second data indicating that a manufacturer of the replaceable supply component has approved reprocessing of the replacement supply component by the remanufacturer; and
transmitting, to the computing device of the remanufacturer, the second data to append data content of the memory with the second data, to designate the replaceable supply component as reprocessed, and to designate that reprocessing of the replaceable supply component by the remanufacturer has been approved by the manufacturer of the replaceable supply component.

9. The non-transitory computer-readable storage medium of claim 8, wherein the processing further comprises:
in response to unsuccessful authorization, provide third data to deny authorization for reprocessing the replaceable supply component by the remanufacturer.

10. The non-transitory computer-readable storage medium of claim 8, wherein generating the second data comprises:
extracting a supply identifier and supply data from the first data;
identifying the account using the supply identifier; and generating the second data as a cryptographically signed data structure based on the account and an encoding device identifier.

11. The non-transitory computer-readable storage medium of claim 10, wherein the processing further comprises:
aggregating the supply data with additional supply data obtained from a plurality of additional replaceable supply components.

12. The non-transitory computer-readable storage medium of claim 8, wherein the first data includes a supply identifier and supply data associated with prior use of the replaceable supply component, and the processing further comprises:
aggregating the supply data with additional supply data obtained from a plurality of additional replaceable supply components; and
providing analytics on use of supplies using the supply data, the additional supply data, and associated supply identifiers.

13. A system comprising:
a plurality of distributed computing devices to provide a reprocess service; and
a portal to communicatively connect the plurality of distributed computing devices to a plurality of external devices including an encoding device of a remanufacturer of replaceable supply components, wherein the plurality of distributed computing devices are to:
receive, from the encoding device of the remanufacturer, a request to reprocess a replaceable supply component, the request including first data and the first data including original manufacturing data stored in memory of the replaceable supply component;
verify authorization of the of the remanufacturer using an encoding device identifier;
verify authorization of the replaceable supply component to be remanufactured using a supply identifier; and
in response to verified authorization of the encoding device and the replaceable supply component, transmit second data to the encoding device to append data content of the memory with, to designate the replaceable supply component as reprocessed, and to designate that reprocessing of the replaceable supply component by the remanufacturer has been approved by a manufacturer of the replaceable supply component.

14. The system of claim 13, wherein the first data further includes supply data and reprocessing data, and the plurality of distributed computing devices are to further:
aggregate the supply data and reprocessing data with additional supply data and additional reprocessing data from a plurality of additional replaceable supply components; and
track supply use and use of the reprocess service using the aggregated data.

15. The system of claim 13, wherein the plurality of distributed computing devices are to:
generate the second data as a binary large object (blob) formatted based on a type of the replaceable supply component, wherein the blob includes the supply identifier which is unique to the replaceable supply component and is provided as part of the request; and
cryptographically sign the blob.

* * * * *